United States Patent [19]

Saito

[11] Patent Number: 5,211,519

[45] Date of Patent: May 18, 1993

[54] PLASTIC GROMMET

[75] Inventor: Kazuo Saito, Yokohama, Japan

[73] Assignee: Nifco, Inc., Yokohama, Japan

[21] Appl. No.: 845,043

[22] Filed: Mar. 3, 1992

[30] Foreign Application Priority Data

Mar. 11, 1991 [JP] Japan .................................. 3-020934

[51] Int. Cl.[5] ............................................. F16B 13/06
[52] U.S. Cl. ........................................ 411/45; 411/48
[58] Field of Search ..................... 411/40, 41, 45, 48, 411/15, 60, 57, 508

[56] References Cited

U.S. PATENT DOCUMENTS

| 3,116,528 | 1/1964 | Poe | 411/15 |
| 4,391,559 | 7/1983 | Mizusawa | 411/45 |
| 4,403,377 | 9/1983 | Mizusawa | 411/15 X |
| 4,952,106 | 8/1990 | Kubogochi et al. | 411/48 |
| 5,085,545 | 2/1992 | Takahashi | 411/48 X |

FOREIGN PATENT DOCUMENTS

| 58-33298 | 7/1983 | Japan . | |
| 1520155 | 8/1978 | United Kingdom | 411/15 |

Primary Examiner—Rodney M. Lindsey

Attorney, Agent, or Firm—Jacobson, Price, Holman & Stern

[57] ABSTRACT

The present invention relates to a pin-type grommet made of synthetic resin. It relates to an improvement of a grommet in which elastic stoppers of a female member are pressed outwardly by press fitting an insertion pin so that the collar and the elastic stoppers of the female member securely hold a plate member, and in which the plate member securely held by the female member is released by screwing out a pin type male member inserted in the female member. More specifically, the present invention relates to a grommet made of synthetic resin in which the male member to be inserted in the female member is provided on its leg with dents which receive the catches of the elastic stoppers, inclined portions which extend upwardly from the dents toward the peripheral surface of the leg, and a portion with larger diameter which presses the elastic stoppers outwardly, the portion with larger diameter being circular in horizontal cross section, and having flat surfaces each with an arcuate side and facing the head of the male member thereby constituting engagement faces for the catches of the female member.

2 Claims, 3 Drawing Sheets

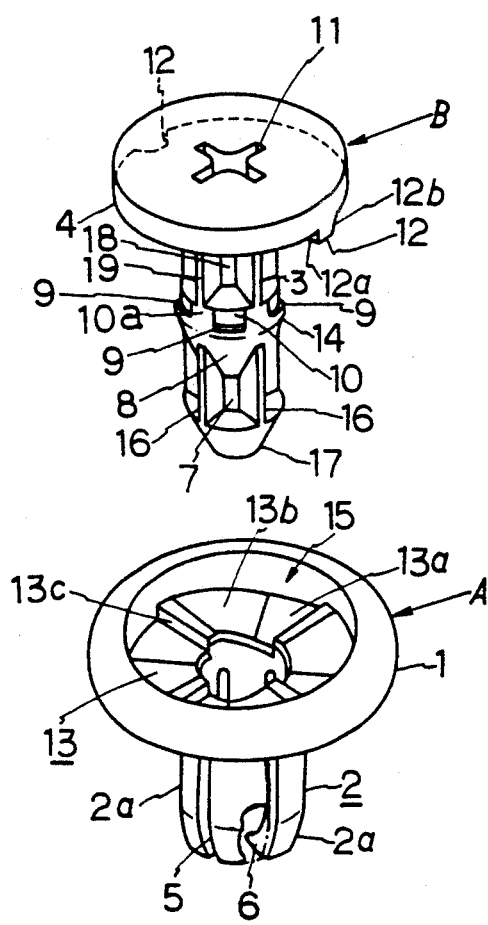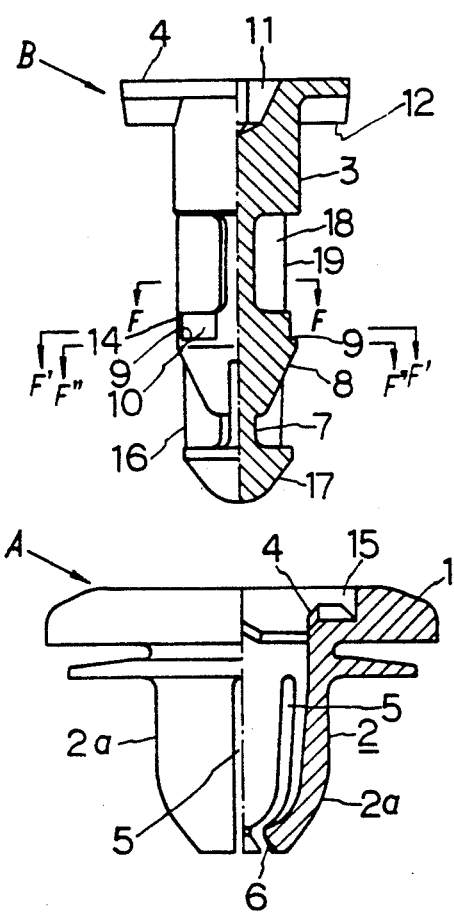

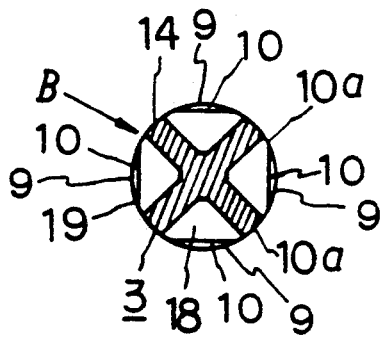
FIG. 5
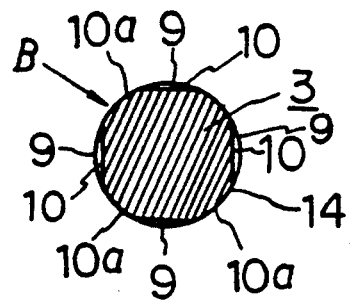
FIG. 6
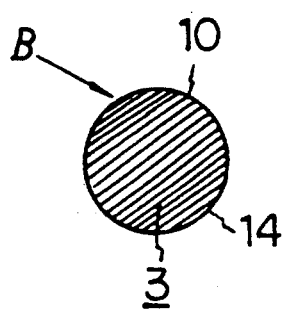
FIG. 7
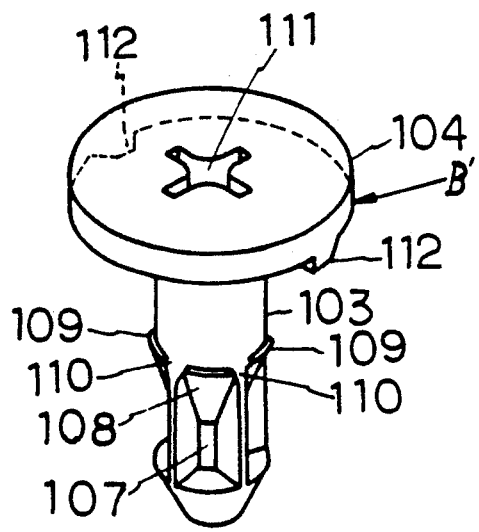
FIG. 9
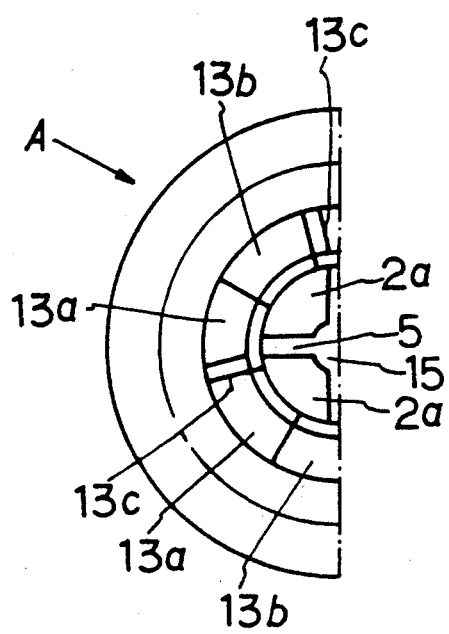
FIG. 8
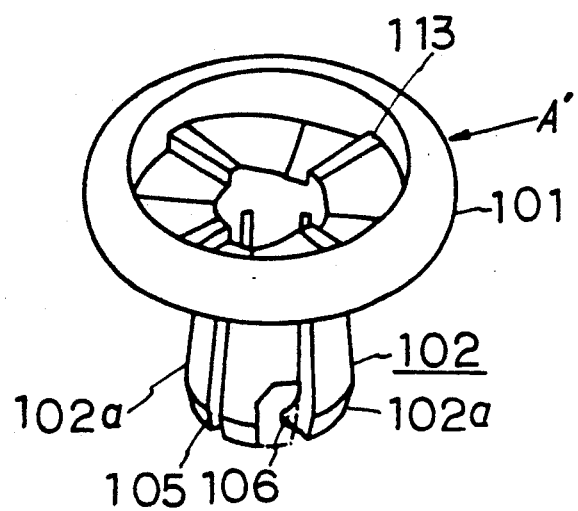

PLASTIC GROMMET

FIELD OF THE INVENTION

The present invention relates to a pin-type grommet made of synthetic resin in plastic. More particularly, it relates to an improvement of a grommet in which elastic stopper means of a female member are pressed outwardly by press fitting an insertion pin so that the collar and the elastic stopper means of the female member securely hold a plate member, and in which the plate member securely held by the female member is released by screwing out the pin inserted in the female member.

Still more specifically, the present invention relates to a grommet made of synthetic resin which is characterized in that the male member to be inserted in the female member comprising plural elastic stopper means having catches on their inside is provided on its leg with dents which receive said catches of the elastic stopper means, inclined portions which extend upwardly from the dents toward the peripheral surface of the leg, and a portion with larger diameter which presses the elastic stopper means outwardly, said portion with larger diameter being circular in horizontal cross section, and the flat surface thereof having one arcuate side and facing the head of the male member and constituting engagement faces each as stepped portions with respect to the peripheral surface of the portion with larger diameter together with a vertical flat plane thereof which is parallel to the axial center line of the leg, so that the male and the female members can securely be coupled with each other.

BACKGROUND OF THE INVENTION

Grommets made of synthetic resin such as shown in FIG. 9 have commonly been used when plate members are assembled or disassembled in a very limited space, such as in the case of fitting metal clips to a panel to secure a plate which is used as a foot rest provided beneath the door frame of an automobile.

The synthetic resin grommet comprises a female member A' which in turn comprises a cylindrical body portion 102 having at its upper portion a collar 101 that extends outwardly, and a male member B' which comprises a leg 103 to be inserted in the cylindrical body portion 102 of the female member A' and a head 104 to be fitted in said collar 101 of the female member A'. Plural slits 105, 105 are provided in the cylindrical body portion 102 extending from the tip end thereof toward the collar 101 to form plural elastic stopper means 102a. A catch 106 is provided on the inside of each elastic stopper means 102a at its lower end.

Dents 107 which receive the respective catches 106 of the stoppers 102a in the female member A' are provided on the leg 103 by segmenting the leg along its circumferential periphery. Each inclined surface between a dent 107 and the peripheral surface of the leg 103 in the direction of the head 104 is denoted as a slope 108. Horizontally stepped portions 109 are provided on the peripheral surface of the leg above the slopes 108, the stepped portions 109 being concentric with the leg.

Portions of the horizontal steps 109 are cut out in the longitudinal direction of the leg to form inclined surfaces 110.

As a result, when the male member B' is inserted in the female member A' which has been inserted in a fixing hole of a panel or the like, the elastic stopper means 102a of the female member A' are fitted first in the dents 107 of the male member B' and pressed outwardly by the slopes 108 of the male member B', while the catches 106 of the female member A' are held stopped at the horizontal steps 109. Thus, the panel is tightly held between the expanded elastic stoppers 102a and the collar 101 at the mouth of the fixing hole.

When a screw driver is inserted in the cross groove 111 of the male member B' to turn the male member B', projections 12 at the lower face of the head 104 of the male member B' move along the cam surfaces 113 provided in the collar 101 of the member A' and cause the male member B' to come off from the female member A'. By doing so, the intense pressing force of the catches 106 acting on the horizontal steps 109 is released while the catches 106 are guided toward the inclined surfaces 110.

By guiding the catches 106 from the horizontal steps 109 toward the inclined surfaces 110, the catches 106 snap fit into the dents 107 of the male member B' by their elastic resilience and return to the original position instead of being expanded outwardly, whereby the engagement of the grommet with the fixing hole of the panel is released.

Such prior art grommet is advantageous in that the grommet can easily and securely hold a panel at its fixing hole by inserting the female member A' and male member B' into said fixing hole, with the two members being coupled together, and by driving the male member B' further into the female member A'. By turning the male member B' pressed into the female member A', engagement between the grommet and the fixing hole of a panel is secured. On the other hand, because the horizontal steps 109 of the male member B' which receive the elastic stopper means 102a of the female member are concentric with the leg 103 and because the horizontal steps 109 are cut in the longitudinal direction of the leg to form inclined surfaces 110, it was somewhat difficult to hold the male member B' in firm engagement with the female member A' or to smoothly release their engagement.

In particular, because the horizontal steps 109 formed on the leg 103 of the male member B' are concentric with the leg 103, the pressing force generated between the catches 106 of the elastic stopper means 102a and the horizontal steps 109 would not change even when the male member B' is turned, having the male member B' turned with uniform force with respect to the female member A'.

This inconveniently causes spontaneous slackening of the engagement between the two members A' and B'. Moreover, as the cut surfaces 110 are inclined, the elastic stopper means 102a of the female member A' guided onto these surfaces 110 would not easily slide toward the dents 107; instead, they are caused to move by the elastic resilience of the stopper means 102a along the surfaces 110 while resisting against the latter.

Moreover, it is extremely difficult to accurately form the horizontal steps 109 which are concentric with the leg 103 and the inclined surfaces 110 which are obtained by cutting the steps 109 in the longitudinal direction of the leg, requiring highly skilled workers to form the mold for the male member B' and to remove the member from the mold.

SUMMARY OF THE INVENTION

A grommet made of synthetic resin according to the present invention is intended to improve such prior art grommet.

One of the primary objects of the present invention is to provide a grommet of synthetic resin which can be manufactured by using a simple mold and with an easy operation.

Another object of the present invention is to provide a grommet made of synthetic resin which prevents its male member fitted and tightly held in the female member from spontaneously coming out of engagement.

Other objects of the present invention will become apparent from the following detailed description and the scope of patent claims taken in conjunction with the accompanying drawings.

BRIEF DESCRIPTION OF DRAWINGS

In the drawings,

FIG. 1 is a perspective view of the grommet according to the present invention with its component parts being dissembled.

FIG. 2 is an exploded front view of the grommet to show its essential parts.

FIG. 5 is a sectional view taken along the line F—F in FIG. 2.

FIG. 6 a sectional view along the line F'—F' in FIG. 2, and

FIG. 7 a sectional view along the line F"—F" in FIG. 2.

FIG. 8 is a plan view to show the essential parts of the female member when viewed from the side of the collar.

FIG. 9 is a perspective view to show the prior art grommet.

DESCRIPTION OF PREFERRED EMBODIMENT

Figure 3:
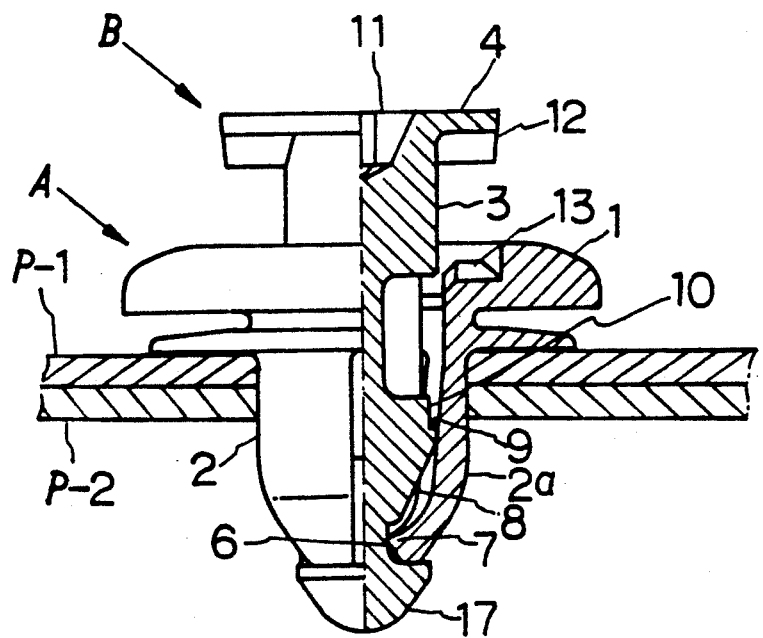
FIG. 3 is sectional front view of the grommet to show the essential parts white assembling the grommet.

An embodiment of the present invention will now be described in more detail.

The grommet shown in FIGS. 1 through 8 is suitably used for connecting more than two plate members, particularly for detachably connecting and fixing such members. It comprises a female member A made of synthetic resin and comprising a cylindrical body 2 with a collar 1 that extends outwardly at the top of the body 2, and a male member B made of synthetic resin and comprising a head 4 and a leg 3 which extends integrally from the head 4.

Plural slits 5 are provided at the lower end of the cylindrical body 2 of the female member A extending toward the collar 1. The portions of the cylindrical body 2 segmented by said slits 5 are used as plural elastic stopper means 2a.

At the lower ends of the stopper means 2a on the inside are provided catches 6 facing inward, so that when the elastic stopper means 2a are deflected by the male member B they are deflected for the thickness of each catch 6.

The collar 1 provided at the top of the cylindrical body 2 has a circular dented portion 15 which is larger in diameter than and communicates with the hollow portion of the cylindrical body 2. Stepped cam faces 13 are formed in the circumferential direction of the dented portion 15. The cam faces 13 will come in contact with projections 12 formed on the head 4 of the male member B, the projections 12 being described hereinafter. Each cam face 13 includes a flat face 13a which each projection 12 becomes contacted with when the catches 6 of the female member A stop against the engagement faces 9 of the member B, an inclined face 13b which is inclined upward starting from the flat face 13a in the direction of turning of the male member B, and a perpendicular wall 13c which starts from the flat face 13 and ends at a position located toward the side where the member B stops turning.

The male member B is provided at a given interval in the radial direction with dents 7 in each of which a catch 6 of the elastic stopper means 2a in the female member A fits, and which are sectioned by partitions 16. The tip end portion 17 of the leg has a larger diameter. Slopes 8 are formed on the leg inclined outwardly toward the head 4. The dents 7 are formed on the leg 3.

The portion 14 of the leg 3 located above said slopes 8 is larger in diameter and has a circular horizontal cross section, where engagement faces 9 facing the head 4 are formed.

The engagement faces 9 are formed at the bottom of a vertical flat plane 10 of the portion 14 as an indent from the peripheral surface of the portion 14 and are normal to the axial center line. The flat plane 10 of the portion 14 is formed by cutting out the peripheral surface of the portion 14 as a plane which is parallel with the line tangential to the leg, or parallel with the center line of the leg.

As a result, each engagement face 9 (see FIG. 5) has one linear side or "inner edge" which coincides with the lower side of the vertical flat plane 10 and one arcuate side or "outer edge" which coincides with the periphery of the portion 14, the arcuate side merges with the peripheral surface 10a of the portion 14 at both ends.

It is noted that there are four engagement faces 9 in the radial direction of the portion 14 of the leg in this particular embodiment.

As shown in FIGS. 5 and 6, each engagement face 9 on the portion 14 which is a square in section has an arcuate side which merges with the peripheral surface of the leg at the four corners of said square section.

A groove 11 for a screw driver is provided on the top face of the head 4, while a pair of projections 12, 12 are so provided that each stopper wall 12a thereof substantially coincides with a horizontal line that passes the center of the head 4. The other side of each projection 12 is formed as an inclined face 12b, which climbs up along the inclined face 13b of the cam face 13 in the female member A.

By providing dents 18 which are similar to dents 7 adjacent the head 4 of the leg 3 in the male member B between the partitions 19, 19 that are provided radially, it is possible to reduce the weight of the leg 3 and to prevent deformation during molding.

The male member B of the above construction is first fitted inside the female member A, and then the assembled members are inserted in the fixing holes on the first plate member P-1 and the second plate member P-2 that are stacked together, as shown in FIG. 3.

Figure 4:
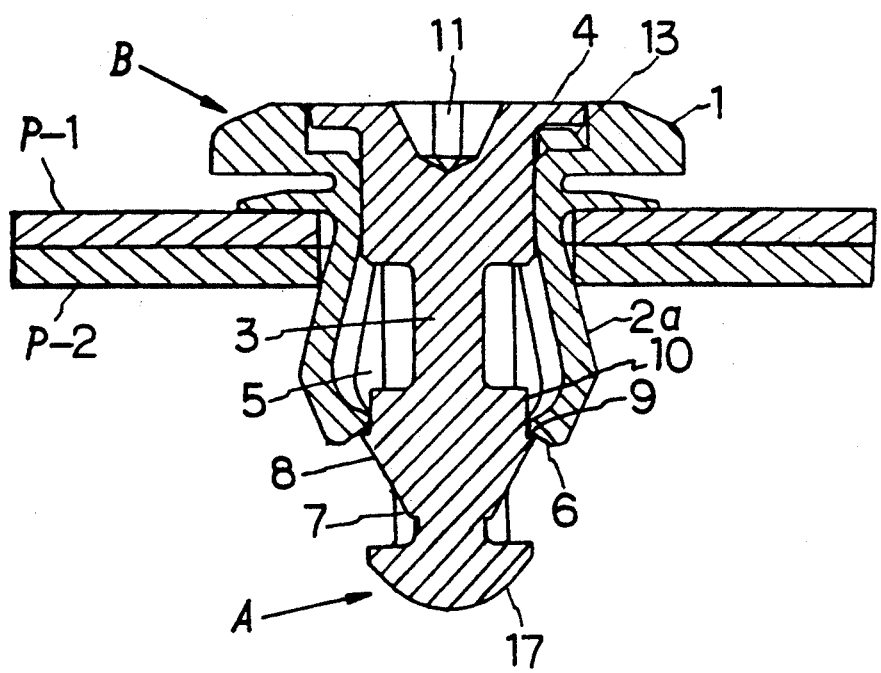
FIG. 4 is a sectional front view to show the grommet when assembled.

At this stage, each catch 6 of the elastic stopper 2a in the female member A fits into respective dent 7 of the male member B. By pressing the male member B further into the female member A, the catches 6 of the female member A are caused to rest against the partitions 16 on both sides of the dents 7, causing the elastic stoppers 2a of the female member A to be deflected outward by the inclined portions 8 of the male member B and stopped by the engagement faces 9 located at the portion 14 with larger diameter. As a result, the first and the second plate members P-1 and P-2 are firmly connected, as shown in FIG. 4.

By inserting a screw driver or the like into the groove 11 and turning the male member B therewith, the projections 12 of the male member B will move along the inclined face 13b of the cam face 13 in the female member A under a force acting in the direction in which the engagement of the male and the female members is reinforced, the force being generated by the male member B as it is resisted by the cam member of the female member A. Thus the male member B is turned while the pressing force of the catches 6 against the flat plane 10 located above the the engagement faces 9 being gradually increased. Then, as the catches 6 are guided from the engagement faces 9 toward the plane 10a, the catches 6 will slide over the plane 10a which is identical in construction with the peripheral surface of the leg 3, to be smoothly guided into the dents 7 via the inclined portion 8 without resistance, to thereby release the engagement between the first and the second plate members P-1, P-2.

In the embodiment mentioned above, there are provided four elastic stoppers 2a in the female member A. The engagement faces 9 are provided at an given interval in the radial direction, or in the direction of the peripheral surface of the leg, so that the faces will not come in contact with each other.

It is noted that the engagement faces 9 can be provided in any number and in any shape so long as they correspond with the number and the shape of the elastic stopper means 2a of the female member A. Moreover, so long as there are provided more than two engagement faces 9, these faces 9 need not be provided at a regular interval.

In the grommet made of synthetic resin according to the present invention, as has been described in the foregoing, because each engagement face 9 of the male member B by which the catch 6 of the elastic stopper 2a in the female member A is detachably stopped comprises the flat plane 10 provided at said portion 14 with larger diameter of the leg 3 and the horizontal face with one arc side which is formed as a stepped portion from the peripheral surface of the portion 14, each catch 6 of the female member A becomes pressed gradually harder against the engagement face 9 as the male member B is turned to be driven further into the female member A, to thereby prevent slackening of the engagement between the female and male grommet members which would be caused otherwise due to vibrations or the like.

Because both sides of each engagement faces 9 are made continuous with the peripheral surface 10 of the leg 3, the catches 6 of the female member A, as they are guided out of the engagement faces 9 by turning, can move smoothly toward the dents 7 via the plane 10a.

As a result, the elastic stoppers 2a held stopped at the engagement faces 9 are caused to come in contact with the leg 3 at a portion gradually off the center of the latter as the male member B is being turned. As the elastic stoppers 2a are pulled off the center, this pulling force acts to prevent the male member B from becoming slackened within the female member A by vibrations or the like.

The catches 6 of the elastic stoppers 2a which have come out of the engagement faces 9 will now slip into the dents 7 via the plane 10a which is the peripheral surface of the leg 3, ensuring the male member B to return when its engagement is released.

The construction is such that both the engagement faces 9 and the plane 10 can be easily released from a mold simply by opening the mold in the direction orthogonal to the radial direction of the leg 3 which is circle in section. This enables easy supply of male members with excellent dimensional stability.

What is claimed is:

1. A grommet comprising a female member made of synthetic resin which includes a cylindrical body having a top with a collar that extends outwardly, plural slits extending from a lower end of the cylindrical body toward the collar, plural elastic stoppers defined by said slits and a catch provided at a lower end of said elastic stoppers and facing inwardly, and a male member made of synthetic resin which includes a head, a leg extending integrally from the head, sectioned dents provided in said leg into which each said catch of the elastic stoppers is adapted to be engaged and an inclined portion that extends outwardly from each said dent toward the head and to a peripheral surface of the leg, the grommet being characterized in that the leg has an enlarged diameter portion located above the inclined portions which is a circle in section and is provided with lateral engagement faces opposing said head and each having an arcuate outer edge formed by a peripheral surface of the enlarged diameter portion and a linear inner edge formed by a flat surface of the larger diameter portion which is parallel to an axial center line of said leg, whereby the catches on the elastic stoppers of the female member are deflected outwardly by the inclined portions of the male member when the male and female member are assembled and are held stopped by said engagement faces.

2. A grommet comprising a female member made of synthetic resin which includes a cylindrical body having a top with a collar that extends outwardly, four slits extending from a lower end of the cylindrical body toward the collar, four elastic stoppers defined by said slits and a catch provided at a lower end of each of said elastic stoppers and facing inwardly, and a male member made of synthetic resin which includes a head, a leg extending integrally from the head, four sectioned dents provided in the leg into which each said catch of the elastic stoppers become engaged and an inclined portion that extends from each of said four dents outwardly toward the head to a peripheral surface of the leg, the grommet being characterized in that the leg has an enlarged diameter portion located above the inclined portions which is a circle in section and is provided with lateral engagement faces opposing said head and each having an arcuate outer edge formed by a peripheral surface of the enlarged diameter portion and a linear inner edge formed by a flat surface of the larger diameter portion which is parallel to an axial center line of said leg, the engagement faces being circumferentially spaced at regular intervals whereby the catches on the elastic stoppers of the female member are deflected outwardly by the inclined portions of the male member when the male and female members are assembled and are held stopped by said engagement faces.

* * * * *